126,397

UNITED STATES PATENT OFFICE.

NOAH C. JARRELL, OF HIGH POINT, NORTH CAROLINA.

IMPROVEMENT IN MEDICAL COMPOUNDS FOR THE TREATMENT OF CONSUMPTION.

Specification forming part of Letters Patent No. 126,397, dated May 7, 1872.

I, NOAH CUDE JARRELL, of High Point, in the county of Guilford, in the State of North Carolina, have invented or compounded a Medicine for the Cure of Consumption.

The following is the process: Take half a pound of mullen-root and half a pound of hoarhound, and put it into six quarts of water and boil it down to two quarts. Then add one (1) quart corn whisky; one and one-half (1½) ounces oil of tar; one (1) quart apple vinegar; one (1) quart molasses; four ounces strained honey; one dozen fresh hen's eggs, shell and all.

Bury it in the earth two feet deep for twenty days. It is then ready for use. I put it in a stone vessel and bury it two feet below the surface of the earth, covering the top of the vessel in such a way as to prevent the earth from getting into it, but at the same time allowing the earth to act on it, the whole being covered with the pure earth. I select a high clean place, to prevent water from overflowing it.

What I claim as my invention, and desire to secure by Letters Patent, is—

The manufacture or preparation of a compound, which is denominated Jarrell's expectorant, of the ingredients, in the proportions, and for the purpose set forth.

NOAH CUDE JARRELL.

Witnesses:
A. J. WILLIS,
H. W. WEEDON.